C. M. ZELLERS.
AUTOMOBILE TOP.
APPLICATION FILED MAY 2, 1910.
1,014,553.
Patented Jan. 9, 1912.
2 SHEETS—SHEET 1.
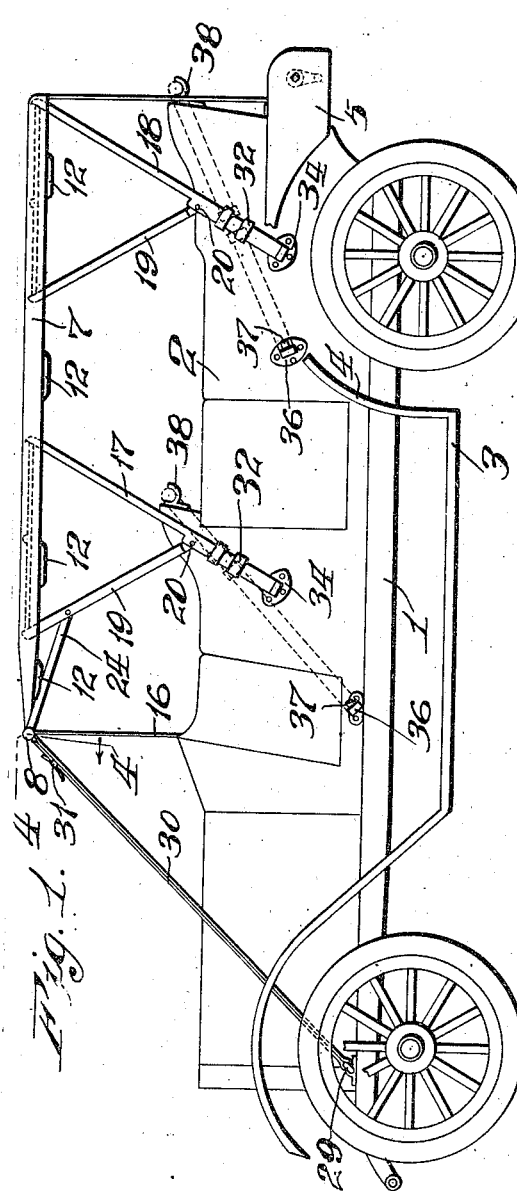
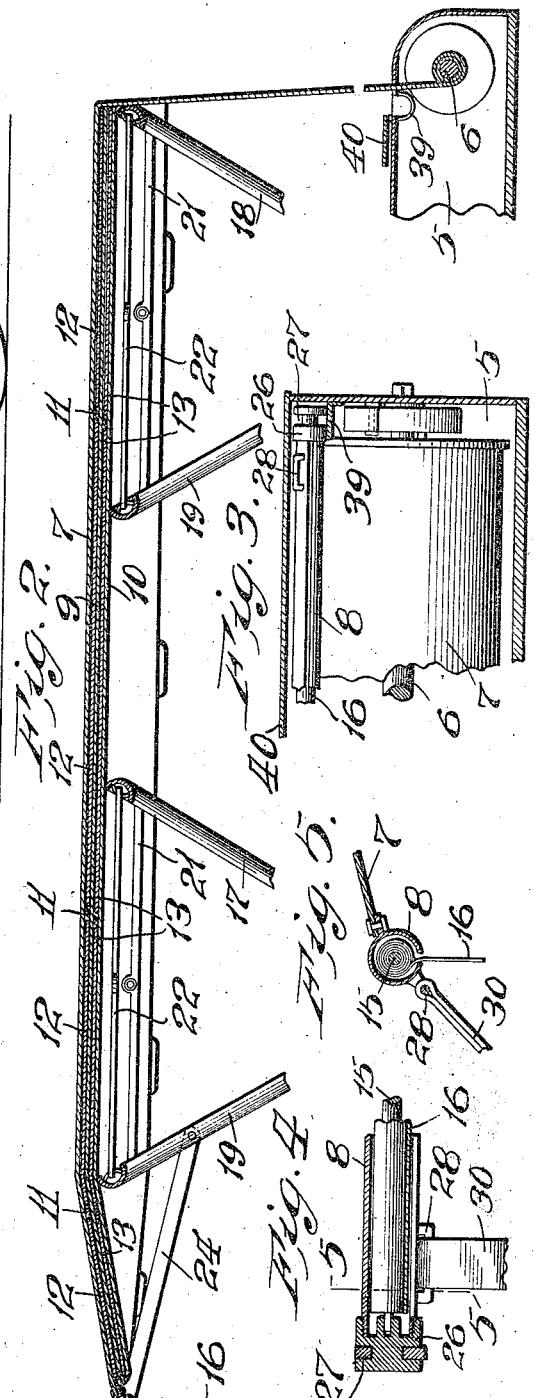

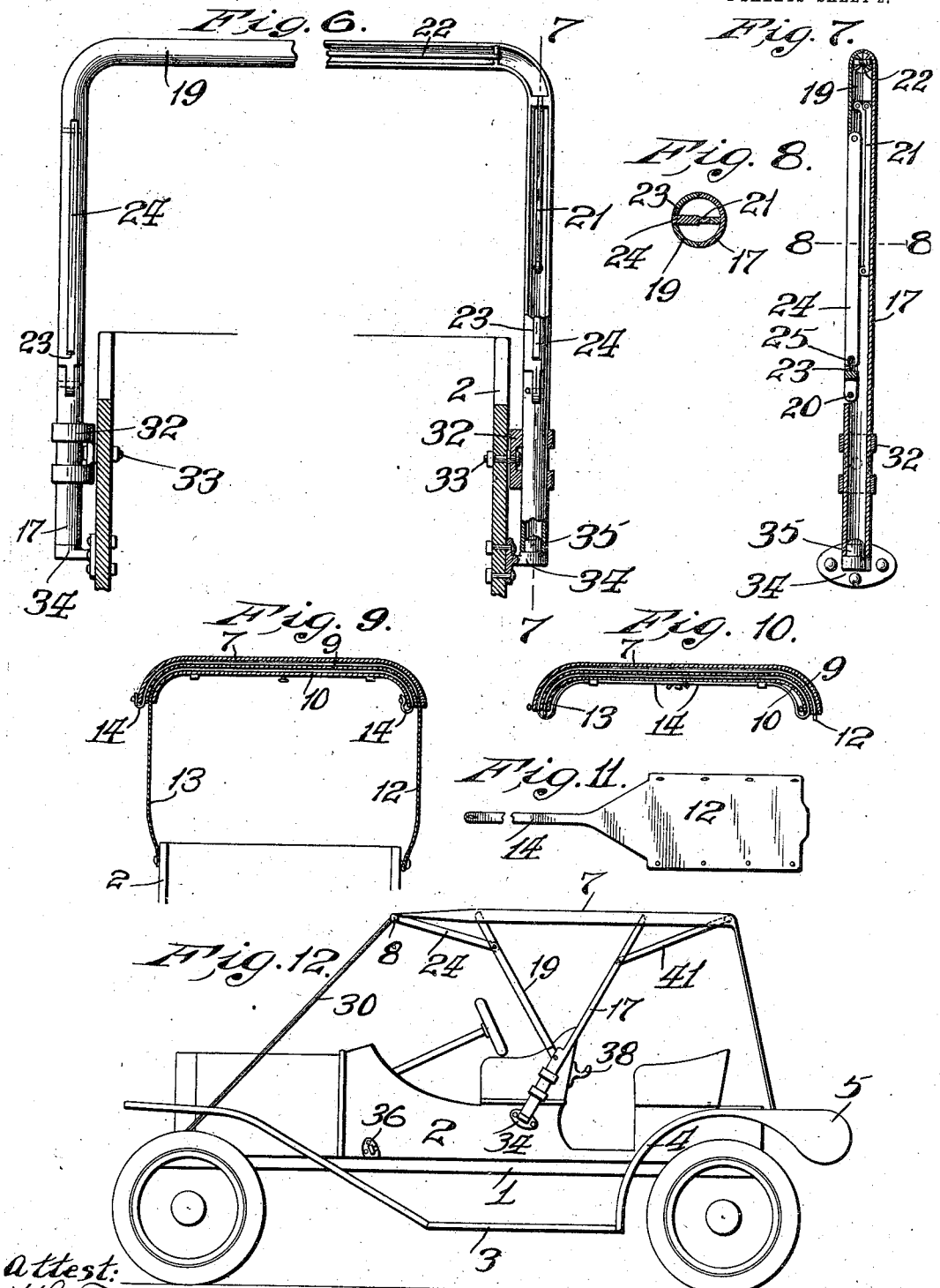

UNITED STATES PATENT OFFICE.

CLAUDE M. ZELLERS, OF ST. LOUIS, MISSOURI.

AUTOMOBILE-TOP.

1,014,553.      Specification of Letters Patent.      Patented Jan. 9, 1912.

Application filed May 2, 1910. Serial No. 558,849.

*To all whom it may concern:*

Be it known that I, CLAUDE M. ZELLERS, a citizen of the United States, and resident of St. Louis, Missouri, have invented certain new and useful Improvements in Automobile-Tops, of which the following is a specification containing a full, clear, and exact description, reference being had to the accompanying drawings, forming a part hereof.

My invention relates to improvements in automobile tops, the object of my invention being to construct a top which may be carried when not in use upon a roll which is arranged at a convenient point preferably to the rear of the rearmost seat.

A further object of my invention is to construct bows for supporting a detachable top, which bows, when not in use, may be carried along the sides of the automobile body and to the rear of the seat backs.

For the above purposes my invention consists in certain novel features of construction and arrangement of parts as will be hereinafter more fully described, pointed out in the claims and illustrated by the accompanying drawings, in which:

Figure 1 is an elevation of an automobile equipped with my improved top; Fig. 2 is an enlarged, longitudinal, sectional elevation illustrating the top proper complete together with the roller and a portion of the housing for the roller, the upper portion only of the bows being shown; Fig. 3 is an enlarged, sectional elevation illustrating one end portion of the housing and the roller showing a portion of the top as when rolled up and out of use; Fig. 4 is an enlarged, detail, sectional elevation illustrating the construction of the forward end of the top proper taken on the line 4—4 of Fig. 1; Fig. 5 is a transverse, sectional elevation taken on the line 5—5 of Fig. 4; Fig. 6 is a view illustrating the construction of the bows and the means for carrying them from the body of the automobile; Fig. 7 is a vertical, sectional elevation taken on the line 7—7 of Fig. 6; Fig. 8 is a transverse, sectional view taken on the line 8—8 of Fig. 7; Fig. 9 is a transverse, sectional view of the top proper showing the side or drop curtains in extended positions; Fig. 10 is a view similar to Fig. 9 and shows the side or drop curtains in a position as when not in use; Fig. 11 is a plan of one of the side curtains removed from the top; and Fig. 12 illustrates a modified form of top.

Referring by numerals to the accompanying drawings:

1 designates the frame and 2 the body of an automobile each of which may be of ordinary construction.

3 designates the running board and 4 the guard for the rear wheel.

5 designates a housing, the end members of which are carried by the wheel guards 4 and 6 designates a roller, spring driven in one direction carried by and inclosed in the housing 5.

7 designates the top proper, the rearmost margin of which is secured to the roller 6 and its forward margin is secured to the tubular casing 8.

9 and 10 designate linings for the top which are spaced and held apart by the transverse ribs 11 dividing the top into separate compartments for the reception of the side curtains 12 and 13 which side curtains occupy the spaces between the top members 7, 9 and 10.

As shown in Fig. 10, each of the side curtains is provided with a strap 14 having a fastening device at its end, the strap being substantially the same length as the curtain proper.

Inclosed within the tubular casing 8 is a spring roller 15, and carried by the roller is a front curtain or wind shield 16, a portion of which is preferably of flexible, transparent material which is not shown.

17 and 18 designate the bows for supporting the top, which bows are preferably tubular. As shown, the upper portion of each bow is divided or split and preferably the rearmost halves of the bows are integral with the end or side portions of the bows, the portions 19 or front halves of the bows being hinged at 20 to the bows proper.

For holding the bows separated or in a position to properly support the top I have provided the knuckle jointed rods or struts 100

21 and 22 which as shown occupy positions wholly within the bows when in a closed or folded position.

The ends of the front half 19 of the foremost bow are slotted at 23 to receive the braces 24 which are pivotally supported at their ends within the front halves 19. The lower end of each of the braces 24 is provided with a slot 25.

The casing 8 is externally threaded at each of its ends to receive the caps 26, and each cap is provided with an annular groove 27 to receive the slotted ends of the braces 24 when in an extended position as shown in Fig. 1.

Arranged adjacent each end portion of the tubular casing 8 is a loop 28 and carried by the machine frame are a pair of loops 29 which loops 28 and 29 are connected by straps 30, each of which is provided with adjusting devices such as a buckle 31.

For holding the bows in an extended position I have provided swivel rings 32 which embrace the lower ends of the bows and which are carried upon the pivots 33 secured to the sides of the body 2.

It is to be understood that the lower ends of the bows are free to move lengthwise through the swivel rings.

34 designates brackets which are secured to the body of the automobile and which are provided with integral projections 35 of a size to fit in the ends of the bows.

For carrying the bows in a closed condition I have provided the brackets 36 which are in positions forwardly and downwardly relative the brackets 34, each of which is provided with the projections 37 to engage in the ends of the bows, the upper portion of the bows being supported by brackets 38 carried by the seat backs. In such a position the portion of the bows just to the rear of the seat backs may be very conveniently employed as racks for holding robes or other furnishings.

39 designates a pocket extending lengthwise of the housing 5 and at its top to receive and hold the tubular casing 8 when the top is wound upon the roller 6 when not in use, and 40 designates a hinged cover for the pocket to completely inclose the top in the housing.

In Fig. 12 I have illustrated a modified form of bow which is substantially the same as my preferred form except that there is a pair of braces 41 carried by the rearmost half of the bow which is substantially the same as the braces 24 carried by the foremost half of the bow. By such an arrangement it is obvious that a single bow may be employed to hold the automobile top in a proper elevated position.

Assuming the bows to be in a closed position, as indicated by dotted lines in Fig. 1, and the top proper to be wholly inclosed within the housing 5 and it be desired to inclose the automobile body the operator lifts the bows removing their lower ends from the brackets 36 to a position over, to be supported by the brackets 34 as shown in solid lines in Fig. 1. The front halves of the bows are then pulled forwardly and supported in an open position by the braces 21 and 22. The tubular casing 8 is then lifted from the pocket 39 of the housing 5 at the rear of the automobile and the top is then unwound from the roller 6 and extended over the tops of the bows with the casing 8 in a position some considerable distance forwardly of the front half of the front bow. In this position the top is prevented from rolling downwardly by the braces 24, the slotted ends of which are placed in the annular grooves 27 of the caps on the ends of the tubular casing 8. The straps 30 are then placed as shown in Fig. 1 to hold the top in place and against the tension of the spring which actuates the roller 6.

For the complete inclosure of the body of the automobile the side curtains 12 and 13 may be drawn downwardly and secured in place by any suitable fastening devices carried along the top margin of the automobile body. In this position the straps 14 occupy the spaces between the layers of the top, their ends projecting slightly so that they may be grasped when it is desired to again place the curtains within the top. By such an arrangement of top and bows, the top proper may be carried when not in use in a rolled condition rather than a folded condition as is common.

To persons familiar with the art to which my invention belongs it is known that the carrying of a top in a folded or creased condition tends to "crack" the top and that the material of the top wears most rapidly and is most subject to leakage at the fold.

By arranging the top as I have done the folding is entirely eliminated, hence I believe a top constructed as shown will have greater life than an ordinary or folding top.

I claim:

1. A bow for automobile tops, comprising a tubular member constructed of separable halves hinged together and means for holding said halves separated at times, which means occupy positions within the bow-members when folded.

2. In combination with suitable bows and means for holding the bows in open and folded positions, a flexible top, a spring actuated roller device for carrying said top when not in use, a roller device carried by said top, a flexible curtain carried by said roller, said flexible top being composed of several layers, curtains carried therebetween, and flexible detachable means for securing said top in place over said bows when in use.

3. In combination with suitable bows, a flexible top, a spring actuated roller device for carrying said top when not in use, a roller device carried by said top, a flexible curtain carried by said roller, said flexible top being composed of several layers, and curtains carried therebetween, substantially as shown.

In testimony whereof, I have signed my name to this specification, in presence of two subscribing witnesses.

CLAUDE M. ZELLERS.

Witnesses:
E. L. WALLACE,
H. G. FLETCHER.